Dec. 19, 1950     J. SILVER     2,534,561
DEVICE FOR DISPLAYING PHOTOGRAPHIC TRANSPARENCIES
Filed June 15, 1946     3 Sheets-Sheet 1

INVENTOR.
JOHN SILVER
BY Westall & Westall
ATTORNEYS

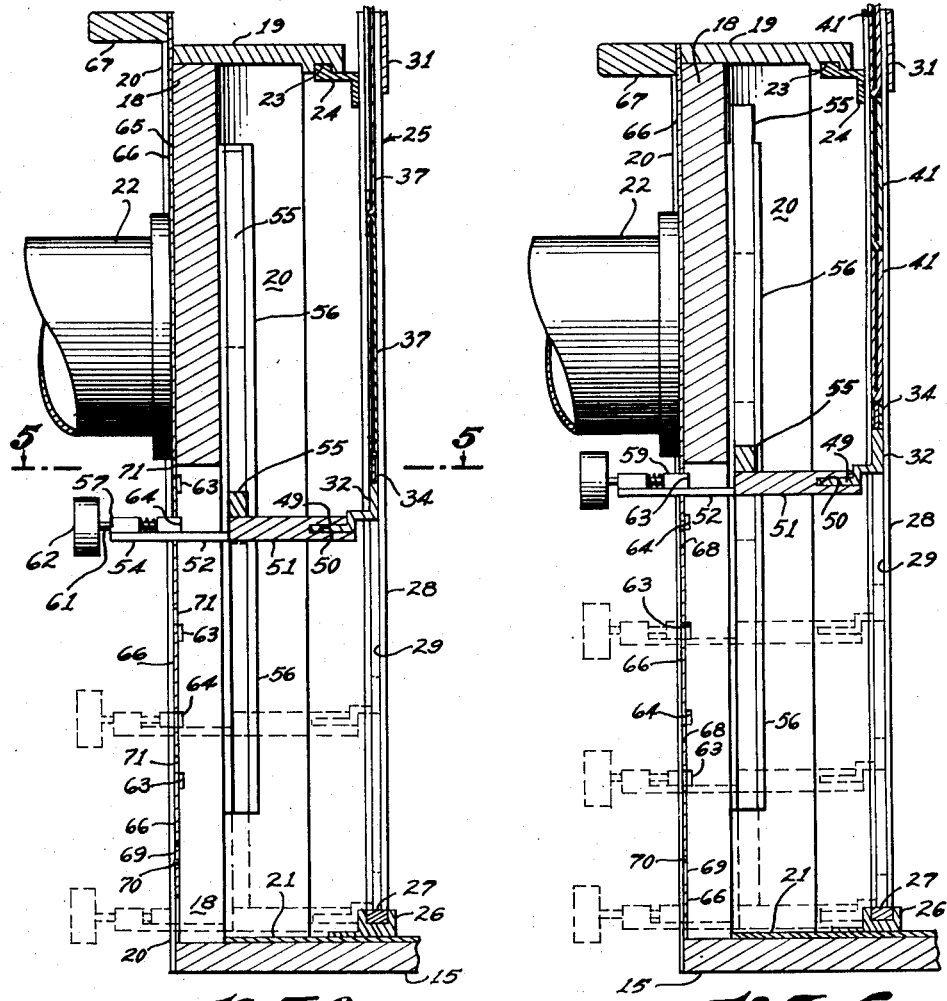
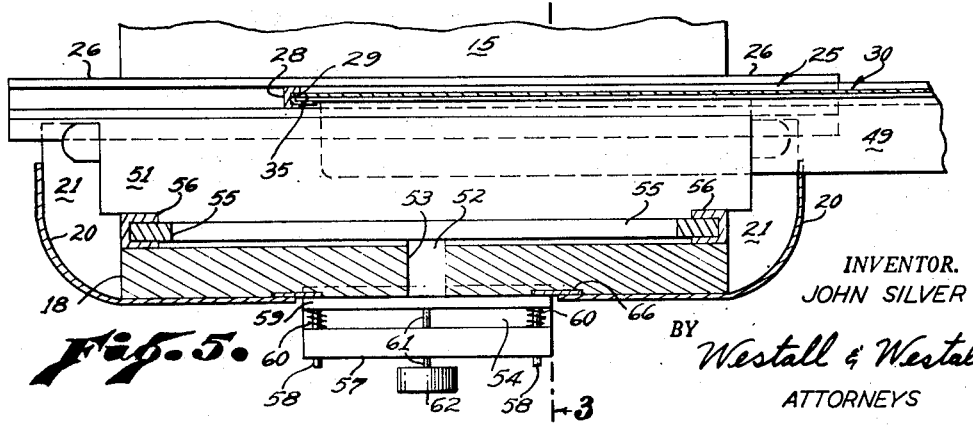

Dec. 19, 1950   J. SILVER   2,534,561
DEVICE FOR DISPLAYING PHOTOGRAPHIC TRANSPARENCIES
Filed June 15, 1946   3 Sheets-Sheet 3
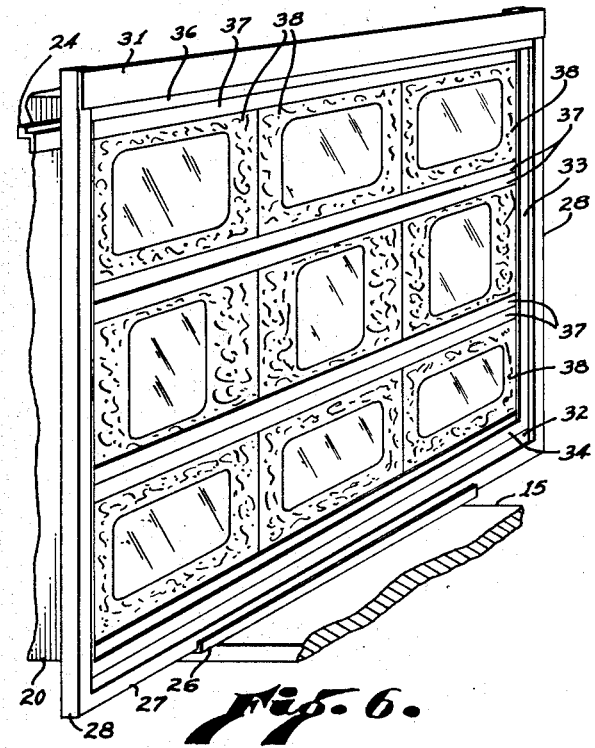
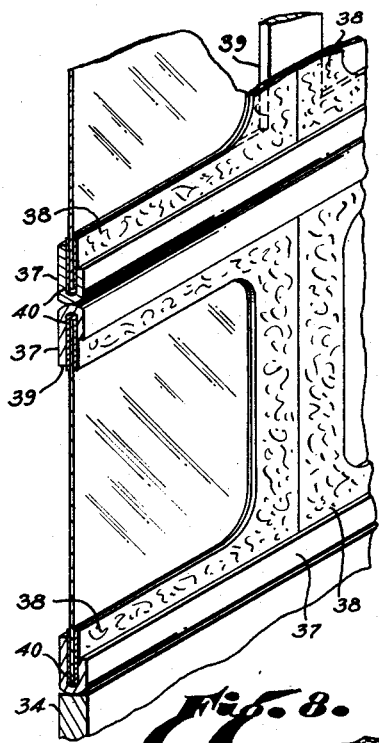
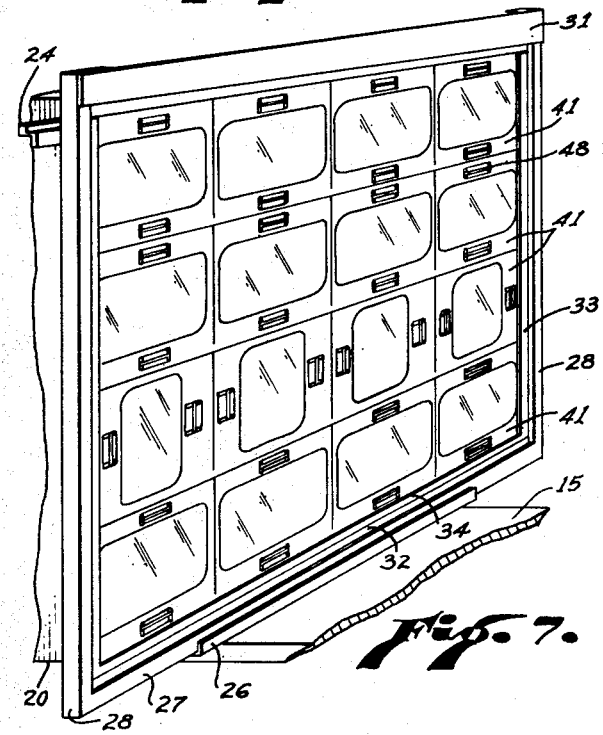
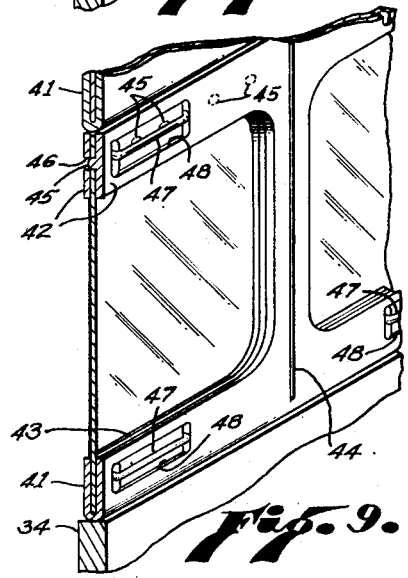
INVENTOR.
JOHN SILVER
BY Westall & Westall
ATTORNEYS Patented Dec. 19, 1950

2,534,561

UNITED STATES PATENT OFFICE 2,534,561

DEVICE FOR DISPLAYING PHOTOGRAPHIC TRANSPARENCIES

John Silver, Hollywood, Calif.

Application June 15, 1946, Serial No. 676,896

1 Claim. (Cl. 88—28)

This invention relates generally to photograph exhibitors, and more specifically contemplates apparatus adapted for use as a projector or hand viewer of photographic transparencies.

Color transparencies are generally printed upon film and are quite small, requiring close examination or magnification to be fully appreciated. In accordance with commercial development of such transparencies, the latter are usually mounted in cardboard frames to facilitate handling. It is common practice for the user to store such transparencies in boxes from which they may be removed and viewed, one at a time, by holding them in front of a light. This, however, is a laborious process which, due to delays in sorting and selecting pictures for successive exhibition, detracts considerably from the full appreciation and enjoyment of the subject-matter.

It is often desirable and more effective to show such pictures in the sequence in which they were photographed or in some other predetermined order so as to preserve a pictorial continuity that corresponds with a verbal or a written description as of different places visited on a tour or trip, a series of successive experiences or the steps in a process of instruction, or the like. However, where the pictures are shown individually to a series of persons it is usually impossible to maintain any particular viewing sequence. Moreover, loose pictures individually mounted for separate handling require constant sorting and manipulation, making the problem of storage and indexing in a manner which permits the location and identity of any thereof almost insurmountable where a large number of pictures is involved.

While the projection of transparencies in accordance with conventional practice obviates the individual handling of each picture by each of a group of persons to whom they are shown, most projectors of the prior art are adapted to receive but a single transparency at a time which necessitates careful prearrangement of the pictures to be projected before the showing begins in order to avoid a break in the continuity while a search is conducted for specific pictures.

It is accordingly a principal object of the present invention to provide mechanism to mount for relative movement in parallel planes a lens system and a frame for a plurality of pictures, e. g., transparent prints, whereby the optical axis of the lens system may be selectively aligned with any of the pictures for either projection upon a screen or hand viewing.

Another and highly important object hereof is to provide a projector adapted to accommodate at one time a plurality of colored transparent pictures mounted in a single composite frame and arranged in rows, one above the other, for selective horizontal alignment with the optical axis of the lens system, the frame being also movable laterally to shift each picture of the aligned row into a beam of light directed through the lens.

Still another object is to provide a projector assembly of the character last referred to, incorporating an elevator mechanism for the selective support and vertical adjustment of either of two types of multi-picture panel-frames, differing from one another in the proximity of the horizontal rows of transparencies carried thereby, including latching means for the elevator mechanism, preadjustable to either type of frame, for locking the elevator successively in a series of positions corresponding to the number of rows of pictures comprising the frame supported thereby so as to successively position each row of pictures in optical alignment with the lens system for projection.

Still another object is to provide a projector assembly embodying guides for lateral movement of a panel of pictures arranged in horizontal rows, which permits the successive operative association of a plurality of panels for alignment of the rows of pictures with the optical system without interruption in the continuity of viewing, one panel being removed from the projector simultaneously with the insertion of another panel therein.

Other objects and salient features of my invention include simplicity of construction, comparative economy of manufacture, convenience of use, and adaptability in affording accommodation to conventional color transparencies.

In the following description specific reference is made to the accompanying drawings of two preferred embodiments of my invention, in which:

Fig. 3 is an enlarged vertical section taken on line 3—3 of Fig. 5, and illustrating one adjustment of the latching mechanism for the frame elevator, dotted lines illustrating the two other positions of the latter with the adjustment depicted;

Fig. 4 is a sectional view similar to Fig. 3, showing a different adjustment of the latching mechanism and, in dotted lines, three additional positions for the elevator;

Fig. 5 is a horizontal section taken on line 5—5 of Fig. 3;

Fig. 6 is a perspective view of one form of composite picture frame, illustrating particularly the guides for its vertical and lateral movement in a projector, the base of the latter being shown in section;

Fig. 7 is a perspective view corresponding to that of Fig. 6, but illustrating a different embodiment of composite picture frame which incorporates four rows of pictures;

Fig. 8 is an enlarged section through a composite picture panel-frame of the type shown in Fig. 6, partially broken away, and illustrating particularly the included row frames for the individual slidable retention of separately mounted pictures;

Fig. 9 is an enlarged section through a picture panel-frame of the type shown in Fig. 7, and depicting the means by which the film transparencies are releasably secured therein;

Figure 1:
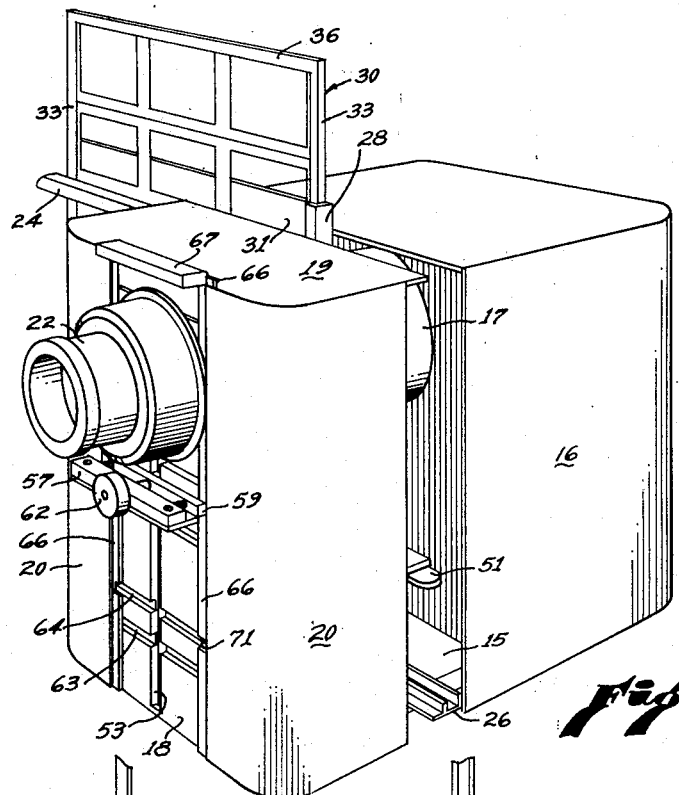
Fig. 1 is a perspective view of a projector embodying features of my invention.
Figure 2:
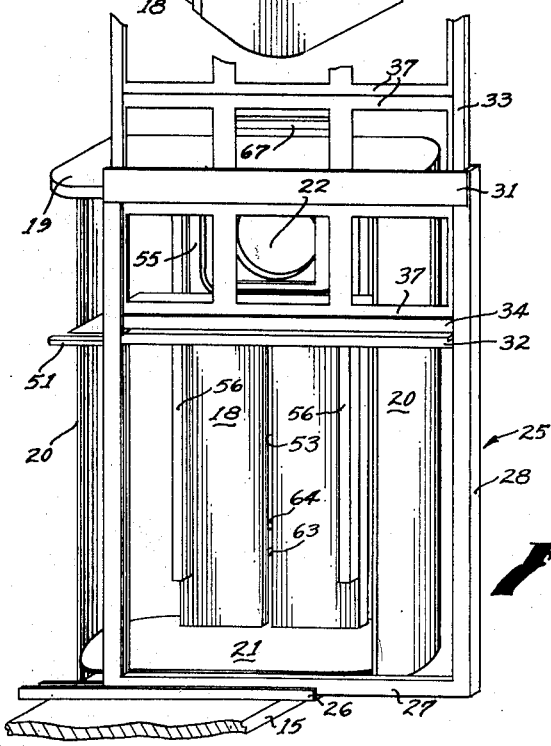
Fig. 2 is a vertical sectional view through the projector looking forward from a vertical plane intermediate the light source and the composite picture frame.

Referring to the drawings more in detail, the numerals of which indicate similar parts throughout the several views, 15 designates a base on one end of which a light box 16 is mounted. Housed within the upper portion of light box 16 is an incandescent lamp or other suitable light source (not shown) disposed in alignment with a lens assembly 17 for directing a beam of light forward and parallel to base 15. The light box 16 may also include an electric fan, and the walls may be formed with vents, the construction and the utility of which apparatus, being well known in the art, is not specifically illustrated.

Mounted to the forward end of base 15 in an upright position is a panel 18 of substantially the same width as the base. A horizontal guide support 19 is secured by suitable means to the top of panel 18 so as to project rearwardly and overhang the back of the latter. Guide support 19 is somewhat longer than the width of panel 18 and formed with arcuate ends which reinforce vertical side plates 20, correspondingly formed in cross-section, which are secured by screws or the like to opposite vertical edges of panel 18. The arcuate contour of the lower ends of respective side plates 20 is reinforced by a bottom plate 21 secured to base 15 and conforming generally in shape and size to the guide support 19 thereabove. Secured to the upper outer surface of the panel 18 in axial alignment with lens 17 is a lens assembly 22 of conventional type adapted for focusing adjustment so as to project an image carried by the beam of light emanating from the light box 16 onto a suitable screen (not shown).

A channel 23 is formed in the undersurface of the guide support 19 adjacent its rearward edge and parallel to the panel 18 for the slidable retention of a bracket 24 secured across the top of a rectangular frame 25. The bottom of frame 25 is slidably supported in a guide 26, parallel with the channel 23 and transverse to base 15 to which it is secured. Frame 25 comprises a bottom bar 27 and a pair of channeled uprights 28 secured to opposite ends of bar 27, respectively. The channels 29 in uprights 28 are opposed to one another and open at their upper ends so as to receive and retain against lateral movement a panel-frame 30, hereinafter more in detail described. 31 indicates a reinforcing strip secured across the back of the uprights 28 adjacent the upper end of frame 25 to supplement bracket 24 in maintaining the rigidity of the frame in operation.

The ends of an elevator bar 32 are slidably accommodated in the respective channels 29 of the uprights 28 whereby bar 32 may be raised and lowered to correspondingly move the picture panel-frame 30 supported thereon. The frame 30 is adapted to receive and retain against relative lateral motion either of two types of horizontal row frames, hereinafter described, in which pictures are mounted, and comprises a pair of upright members 33, each U-shaped in cross-section, a lower bar 34 having its ends secured within the lower ends of opposed channels 35, respectively, and a cross bar 36 joining the upper ends of the uprights. The ends of cross bar 36 are secured by welding or the like to outer surfaces of the respective uprights 33 so as not to restrict the open, upper ends of the channels 35 into which the row frames 37 are to be inserted.

As hereinabove indicated, a projector embodying my invention is adapted to accommodate color transparencies. In accordance with conventional development of pictures of this type, the prints are secured individually in square mountings 38 of cardboard. In order to provide for successive projection of a series of pictures so mounted, the projector includes three elongated row frames 37, above referred to and illustrated particularly in Figs. 6 and 8, each comprising, in the embodiment here contemplated, a single piece of metal having three square cut-outs 39 slightly smaller than the size of the cardboard mounting 38 in which transparencies are secured. The flat ends of frame 37 are adapted for reception in the channels 35 of frame 30, respectively, the latter frame being large enough to receive three row frames 37, one above the other. The upper and lower longitudinal edges of each row frame 37 are turned over to form oppositely disposed channels 40 for the slidable reception and retention of the square cardboard mountings 38 so as to permit three mounted transparencies to be slid through channels 40 of each frame 37 into registry with the square openings 39 in the latter. Thus a total of nine transparencies assembled in three row frames 37 may be placed in a single panel-frame 30. The panel of pictures is then slid into the frame 25 through the upper open end of channels 29 where the assembled pictures are supported in the frame 25 by the elevator bar 32. The three transparencies of each row frame 37 are held against displacement longitudinally of the latter by the abutment of the cardboard mountings 38 of the end pictures with the uprights 33 of the frame 30 into which row frames 37 are slidably received, as above described.

It will thus be observed that by laterally shifting frame 25 across base 15, any vertical row of pictures in the panel-frame 30 may be aligned with the optical system 17—22 and that by vertical adjustment of the elevator bar 32 any one of the three horizontal rows of the pictures may be aligned with the optical system. Accordingly, joint or successive operations of frame 25 and bar 32 carried thereby is effective to shift any one of the pictures carried by panel-frame 30 into the beam of light for projection of its image upon a screen by the lens assembly 22.

In Figs. 7 and 9 I have illustrated a panel-frame 30 carrying row frames 41 of modified form which permits the accommodation of sixteen pictures in a panel-frame of the same size as hereinabove described for holding the three row frames 37 of the cardboard mounted pictures. In accordance with this construction, each row frame 41 comprises a sheet of spring metal bent upon itself to form complementary clamping members 42 having registering cut-outs 43 therein, between which members 42 the individual transparencies, stripped of their cardboard mountings 38, are interposed. In order to facilitate insertion of the transparencies individually into registry with the respective openings 43 in frame 41, one clamping member 42 is cut transversely on each of three parallel lines between adjoining pairs of the four cut-outs 43, as indicated at 44, whereby each section of the clamping member 42 may be individually spread from its counterpart to permit the insertion of the transparencies into registry with the openings 43 therein. It will be observed that individual pictures in any row may be removed and others inserted without disturbing any of the other pictures in the frame.

It is common practice to print transparencies of the type contemplated upon strip film having sprocket holes in its opposite side edges. In order to supplement the resilience of frame 41 in holding the transparencies in adjusted position, I provide a series of small bosses 45 on the inner surface of one member 42 adjacent the open edge of frame 41, which bosses 45 are spaced apart a sufficient distance to register with the sprocket openings of the film and a series of complementary holes 46 in the opposed clamping member 42. The reception of bosses 45 in the holes 46 thus assures contiguous and frictional contact of both sides of the frame with opposite edges of the transparencies so as to hold the latter flat and taut.

An additional or alternative locking expedient for each transparency is illustrated in Fig. 9, and comprises a staple 47 adapted to be projected through holes in the opposite sides of the frame which register with other sprocket holes in the film transparency. In the interest of compactness it is desirable that the surfaces of the clamping members 42 across which each staple 47 extends be recessed, as at 48, in order that the outer surface of the staple will be substantially flush with the corresponding outer surfaces of frame 41.

The elevator bar 32 is raised and lowered so as to correspondingly move panel-frame 30, housing the rows of pictures, by mechanism about to be described, projecting through the panel 18. To this end, elevator bar 32 is provided with an integral, laterally extending slide 49 received in a slot 50 formed in the rearward edge of a vertically-reciprocable plate 51, horizontally disposed between the back of panel 18 and the plane of frame 25. A narrow forwardly extending neck 52, integral with plate 51, projects through a vertical, central slot 53 in panel 18, and connects with an integral actuating member 54 at the front of panel 18 by which plate 51 and elevator bar 32, slidably associated with the latter through extension 49, may be raised and lowered.

The tendency of plate 51 to tilt in response to upward pressure on the actuating element 54 thereof and thus bind the slide 49 or put an excessive strain upon the frame 25 and supporting mechanism therefor is obviated by means of a guide assembly carried at the back of panel 18. This mechanism comprises a heavy U-shaped bracket 55 having its base secured by suitable means to the top of plate 51 closely adjacent the rear surface of panel 18 so as to be raised and lowered with the plate and elevator bar 32 in response to manipulation of the actuating member 54. The sides of the U-shaped bracket 55 are reciprocable in channeled tracks 56 rigidly secured to the back of panel 18. Being U-shaped, bracket 55 is movable upwardly to the top of panel 18, encompassing the beam of light directed from the light source through the lens systems 17—22 without restricting the latter, while assuring maintenance of the frame 25 in a common vertical plane.

In accordance with the most convenient method of utilizing the projector, the elevator mechanism is first raised to align the lowermost row of pictures carried by an inserted panel-frame 30 with the optical system 17—22, whereupon the frame 25 is shifted laterally to successively position each of the three or four pictures comprising the lower row thereof (the number of pictures depending upon the type of row frame employed) in the light path for successive projection of images thereof onto the screen. Thereupon the elevator mechanism, through the manipulation of the actuating member 54, is lowered to align the row of pictures second from the bottom with the optical system. The operation is thereupon continued in a like manner, utilizing gravity to lower the frame, when required, until all pictures have been projected.

Locking mechanism is provided to secure the elevator bar 32 against upward and downward movement at the different positions necessary for supporting the respective rows of pictures carried by the frame 30 in horizontal alignment with the optical axis of the lens system. It will be observed, however, that the vertical disposition of the frame 30, required to align the respective rows of pictures of the embodiment of Figs. 7 and 9, will be different from those positions to which the frame 30 must be shifted in order to successively align the rows of pictures of the embodiment of Figs. 6 and 8 with the optical system, in view of the fact that there are four rows of pictures in the former embodiment more closely arranged than the three rows of pictures of the embodiment of Figs. 6 and 8. Accordingly, the latching mechanism provides for supporting the frame 30 in six different vertically-adjusted positions. Secured to the actuating member 54 of the plate 51 is a bar 57 arranged parallel to but spaced from the front surface of panel 18. In each end of bar 57 a hole is provided for the slidable extension of a short pin 58, the inner ends of which pins are mounted in a latch bar 59. A helical spring 60, encircling each of the pins 58, is interposed between bar 57 and the latch bar 59 so as to normally hold the latter in contact with panel 18. The latch bar 59 is adapted to be withdrawn from engagement with the face of panel 18 by means of a rod 61 having one end mounted in bar 59 and extending slidably through bar 57. A button 62 on the outer end of rod 61 facilitates the application of tension to the latter, which is effective to withdraw the latch bar 59 and compress the springs 60. The front surface of panel 18 is provided with five transverse slots 63 and 64, hereinafter more specifically identified, having cross-sectional dimensions slightly greater than the sectional contour of latch bar 59 which is adapted to be received in the respective slots. The slots 63 and 64 are vertically spaced to receive and engage the latch bar 59 at each of the respective positions of the elevator 32 required to align the various rows of pictures carried by the frames 37 and 41 of the embodiments of Figs. 6 and 7, respectively, with the optical system 17—22. An important feature of the invention resides in the construction of the respective row frames 37 and 41 of the embodiments of Figs. 6 and 7 whereby their installation in the panel-frame 30 and frame 25 assures the alignment of the uppermost row of pictures of either embodiment with the optical axis, when the elevator 32 is in its lowermost position.

It will be observed from an examination and comparison of Figs. 3 and 4 that the first (from the bottom) third and fifth slots 63 are positioned to lock the elevator mechanism in positions whereby the panel-frame 30 of the embodiment of Fig. 7 is supported with the second, third and fourth picture rows in alignment with the optical system, 17—22 whereas the second and fourth slots 64 are provided for positioning a composite picture assembly such as that shown in Fig. 6 with the second and third rows aligned with the optical system. Accordingly, with a frame of pictures such as that shown in Fig. 6 in the laterally-slidable frame 25 for projection onto the screen, each of the three rows of pictures may be successively moved into the beam of light by placing the elevator assembly in its lowermost position and thereafter moving the elevator to engage the latch bar 59 in the second and fourth slots 64, successively. To facilitate this operation, panel 18 is formed with a pair of vertical recesses 65 extending its length and arranged in parallel relation at opposite sides, respectively, of the lens assembly 22. A key strip 66 is slidably disposed within each recess 65, being retained against displacement by the overhang of the arcuate side plates 20. The upper ends of strips 66 are connected by a bar 67 by which the former may be manually raised and lowered in unison for a purpose about to be described. The strips 66 overhang the ends of slots 63 and 64 and upon proper adjustment of bar 67, mask off the ends of the first, third and fifth slots 63, i. e., to prevent engagement of the latch bar 59 therein. The strips 66 are formed with cutouts 68 adapted to register with the second and fourth slots 64 when in a predetermined elevated position, as illustrated in Fig. 3. Accordingly, the uppermost row of pictures of the embodiment of Fig. 6 may be displaced from the beam of light and the second row of pictures aligned therewith by the elevation of the bar 57. During this operation latch bar 59 passes over the lowermost slot 63, its ends riding upon the strips 66, and the latch bar drops into the second slot 64 with which the lower of the two pair of cutouts 68 in strips 66 are in registry. The lowermost row of pictures in the frame of Fig. 6 may then be brought into operative relationship with the beam of light by withdrawing latch bar 59 from lower slot 64 and again elevating plate 51 and elevator 32 until latch bar 59 is aligned with the next pair of cutouts 68, the latter being in registry with the fourth slot 64 of the series.

In order to assure registry of cutouts 68 with the respective second and fourth slots 64 in panel 18, the lower end of each strip 66 is cut away to provide slots 69 into which studs 70, carried by panel 18, project. The arrangement of slots 69 and studs 70 is such as to assure the desired registry of the cutouts 68 with the respective second and fourth slots 64 in the panel, as above described, when studs 70 are engaged with the lower ends of the slots 69.

In a like manner depression of the strip assembly to the limit permitted by studs 70 is effective to misalign the cutouts 68 with the second and fourth slots 64 in panel 18, and coincidentally align another set of three pairs of cutouts 71 with the first, third and fifth slots 63, respectively, so as to adapt the latching assembly for the locking of the elevator mechanism in the successive positions required to align the second, third and fourth rows of pictures of the frame embodiment shown in Fig. 7 with the beam of light directed to lens system 22.

What I claim and desire to secure by Letters Patent is:

In a device of the character described, a frame for a plurality of pictures arranged in rows, an optical system, means to shift said frame relative to said optical system to align different rows of said pictures with said optical system, means to latch said frame in each of several positions supporting respective picture rows of fixed proximity to one another in alignment with the optical axis, means to render said last-named means ineffective, and means to latch said frame in each of a series of positions aligning respective picture rows differing in proximity to one another with respect to the picture rows first named, with said optical system.

JOHN SILVER.

REFERENCES CITED

The following references are of record in the file of this patent:

UNITED STATES PATENTS

| Number | Name | Date |
|---|---|---|
| 712,034 | Berger | Oct. 28, 1902 |
| 1,158,019 | Anderson | Oct. 26, 1915 |
| 1,368,880 | Bettini | Feb. 15, 1921 |
| 1,728,589 | Barron | Sept. 17, 1929 |
| 1,736,071 | Cressler | Nov. 19, 1929 |
| 1,747,400 | Stewart et al. | Feb. 18, 1930 |
| 1,845,410 | Harding | Feb. 16, 1932 |
| 1,949,067 | Wheelock et al. | Feb. 27, 1934 |
| 1,991,578 | Rixen | Feb. 19, 1935 |
| 2,162,025 | McClaughry | June 13, 1939 |
| 2,256,178 | Stuart | Sept. 16, 1941 |
| 2,258,986 | Hutchison | Oct. 14, 1941 |
| 2,271,530 | Wick | Feb. 3, 1942 |
| 2,276,735 | Miller | Mar. 17, 1942 |

FOREIGN PATENTS

| Number | Country | Date |
|---|---|---|
| 16,046 | Great Britain | of 1888 |
| 15,398 | Great Britain | of 1906 |
| 675,940 | France | Nov. 18, 1929 |